Figure 1:
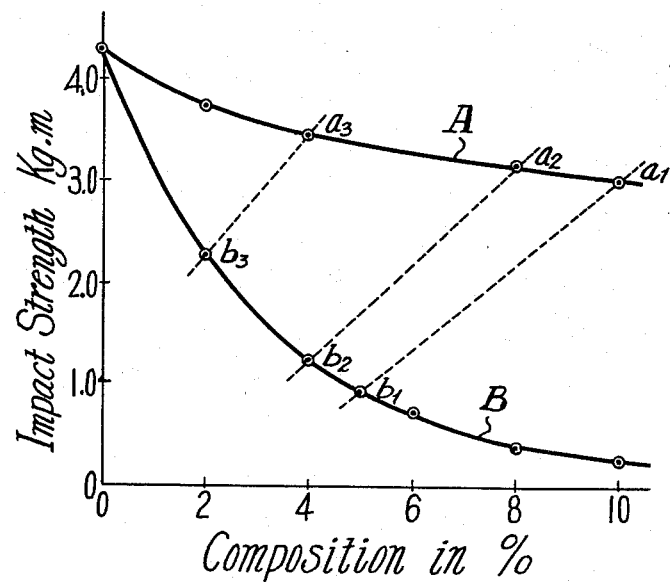

Feb. 2, 1965  YUJI HOSHI ET AL  3,168,594
MIXTURES OF POLYVINYL CHLORIDE AND COPOLYMERS
OF VINYL CHLORIDE AND ALKYL VINYL ETHERS
Filed Sept. 12, 1960

INVENTOR.
Yuji Hoshi & Mitsuo Onozuka
BY
Beaman & Beaman
attys

United States Patent Office 3,168,594
Patented Feb. 2, 1965

3,168,594
MIXTURES OF POLYVINYL CHLORIDE AND COPOLYMERS OF VINYL CHLORIDE AND ALKYL VINYL ETHERS
Yuji Hoshi and Mitsuo Onezuka, both of Nakoso, Japan, assignors to Kureha Kasei Co., Ltd., Tokyo, Japan, a corporation of Japan
Filed Sept. 12, 1960, Ser. No. 55,272
Claims priority, application Japan, Sept. 16, 1959, 34/29,736; Feb. 17, 1960, 35/5,158
5 Claims. (Cl. 260—899)

This invention relates to a new polymeric vinyl chloride composition and more particularly to polyvinyl chloride (PVC) composition which has an improved workability and imparts a high impact resistance, a good resistance to brittleness and a high resistance to heat deformation to the final product.

It is usually known that a processing temperature of PVC is close to that of its thermal decomposition, and the workability of non-plasticized PVC, namely PVC not added with plasticizer, is not good. Generally when rigid PVC articles are intended to be produced a small amount of plasticizer is added thereto or a copolymer consisting of a vinyl chloride as its principal constituent and a further comonomer as its minor constituent is used, in order to improve the workability of PVC.

When final article from PVC composition contains even a slight quantity of plasticizer the impact resistance, resistance to brittleness and resistance to heat deformation of the said article are impaired, as compared with those of non-plasticized composition. Copolymers are able to improve the workability, but inversely they decrease the resistances to impact, brittleness and heat deformation of the final product.

Presently many PVC articles are processed from so-called "semi-rigid" or "rigid" PVC compositions, containing a large amount of plasticizer in order to improve its workability and to decrease a melt viscosity at the time of processing. However, the products thus obtained are lower in the resistance to heat deformation because of a low flex temperature. Furthermore, they have not only weaker resistances to impact and brittleness, but have a defect that the plasticizer used exudes from the product at a later time.

For the purpose of obtaining the final product having high impact strength and low brittle point, impact-resistant PVC compositions are now on the market. However, they have such defects of poor weather resistance that the mechanical properties and the appearance of the product change with the lapse of time on account of the conjugated double bond structure of synthetic rubbers contained in the composition.

It is difficult, at the present time, to obtain PVC composition which has superior processing characteristics, without impairing resistances to impact, brittleness and heat deformation of the final product. Also, any improvements in impact strength and workability of PVC are difficult without deteriorating weather-proof properties.

An object of the present invention is to provide a new PVC composition having improved processing characteristics, as compared with the normal PVC composition usually known at the present, without substantially impairing the resistances to impact, brittleness and heat deformation of the final product.

Another object of the present invention is to provide PVC composition having superior processing characteristics without a danger for the exudation of plasticizer from the final product, as sometimes observed in the case of semi-rigid or rigid products presently used.

Still another object of the present invention is to provide a PVC composition having a comparatively higher impact strength and free from the impairment of the weather-proof property which may be observed in the product made of commercial high impact PVC composition.

Other objects and advantages will become apparent from the following description.

The present inventors have now found that when PVC is blended with a copolymer of a vinyl chloride and an alkyl vinyl ether, the product from the blended composition has superior processing characteristics as well as good resistances to impact, brittleness and heat deformation and simultaneously is free from deficiencies as aforementioned. The present invention is accordingly extremely useful in the extruding, molding and other processing techniques of the PVC, and the new PVC composition produced by the present invention has no defect such that the conventional PVC composition have to be sacrificed its mechanical properties to improve the workability.

The present invention is further illustrated in the following.

The copolymer of vinyl chloride and alkyl vinyl ether, used in the present invention consists preferably of from 60 to 99.5% by weight of vinyl chloride and from 0.5 to 40% by weight of alkyl vinyl ether for the purpose of bringing about the characteristics in the composition of the present invention.

When the copolymer consists of over 99.5% by weight of vinyl chloride and below 0.5% by weight of alkyl vinyl ether, the blended composition thus obtained cannot show any superior workability which is expected in the present invention:

On the contrary, if the copolymer consists of below 60% by weight of vinyl chloride and over 40% by weight of alkyl vinyl ether, the blended composition has poorer impact resistance because of the decreased compatibility and structural inhomogeneity of final product.

The copolymer consisting of from 70 to 98% by weight of vinyl chloride and from 2 to 30% by weight of alkyl vinyl ether can preferably be used in the present invention, too.

The alkyl vinyl ether suitable for copolymerization of the said copolymer should contain between 8 and 18 carbon atoms in the alkyl group for the objects of the present invention. If alkyl vinyl ether containing not more than 7 carbon atoms in the alkyl group is copolymerized with vinyl chloride, the blended composition cannot show any superior workability as in the present invention because of the unsatisfactory degree of internal plasticization of the copolymer. On the other hand, when the alkyl vinyl ether containing more than 19 carbon atoms in the alkyl group is copolymerized with vinyl chloride, the desired copolymer can only be obtained by the slow rate of polymerization, but such a polymerization is not industrial. Optimum results can be obtained when the carbon atom number in the alkyl group is between 12 and 16.

The blended composition should essentially consist of from 5 to 99.5% by weight of PVC and from 0.5 to 95% by weight of the copolymer of vinyl chloride and alkyl vinyl ether, in order to accomplish the objects of the present invention. A blended composition consisting of below 5% by weight of PVC and over 95% by weight of the said copolymer has the superior workability, but is remarkably inferior in the resistance to heat deformation temperature, whereas a composition consisting of over 99.5% by weight of PVC and below 0.5% by weight of the said copolymer cannot satisfy the workability expected as in the present invention. Optimum results can be obtained when the blended composition consists of from 50 to 98% by weight of PVC and from 2 to 50% by weight of the said copolymer.

For the blending in the present invention, PVC now on the market can be used, and accordingly, there is no necessity for selecting the particular grade thereof. PVC composition containing plasticizers can also be used for the present invention if the content of plasticizer is below 10% by weight of the plasticized composition.

As the plasticized PVC composition containing the plasticizer in an amount over 10% by weight is of weak resistances to impact, brittleness and heat deformation, the blending effect on these properties as in the present invention cannot be expected in such plasticized PVC composition. A copolymer consisting mainly of vinyl chloride and a further small amount of other monomer polymerizable with the vinyl chloride, for example, vinyl acetate, vinylidene chloride, alkyl acrylate, alkyl methacrylate, alkyl maleate and the like, can also be used for the present invention instead of the said PVC in the composition, when the content of the second monomer is below 5% by weight of the copolymer. As the product from copolymer containing over 5% by weight of these comonomers is essentially weak in the resistances to impact and heat deformation, the blended composition thus produced cannot show good results for the purpose of the present invention.

The copolymer of vinyl chloride and alkyl vinyl ether, to be blended with the PVC can be made by means of any well known polymerization techniques including emulsion and suspension polymerizations. The blending of PVC and the copolymer of vinyl chloride and alkyl vinyl ether can generally be carried out by mechanical mixing. In some cases it is desirable to blend by adding one composition to the other which is being mixed in Banbury or mixing roll.

Mixing of two polymers in the form of emulsion or suspension is also suitable.

The ratio of these two polymers in the blending depends on the characteristics demanded for the final product.

When the workability is generally desired to be given to the composition of rigid PVC having good resistances to impact, brittleness and heat deformation, the blended composition should contain a small amount of the copolymer of vinyl chloride and alkyl vinyl ether.

Further, if the better workability is desired to be given to the PVC composition, of which mechanical and thermal properties are practically satisfied, a substantial amount of copolymer should be contained in the blended composition.

Thus, the present invention can provide compositions having various excellent properties by selecting a proper blending ratio of two polymers, the content of alkyl vinyl ether in the copolymer and carbon atom numbers in an alkyl group of the vinyl ether.

Figure 2:
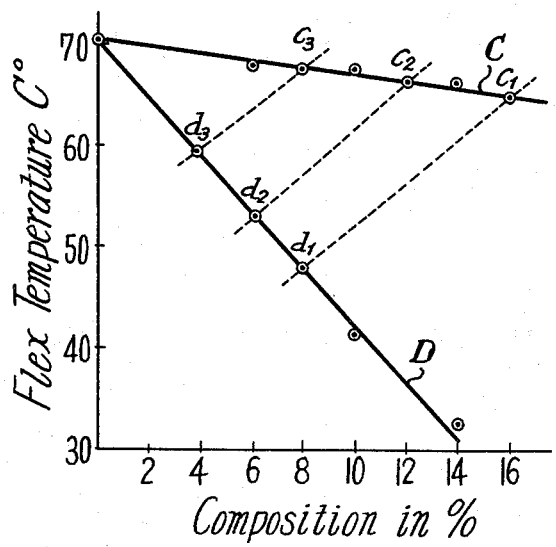

These objects will be more fully understood from the following description made with reference to FIGURES 1 and 2. In FIGS. 1 and 2, the impact strength and flex temperature of the blended composition consisting of PVC (K value 65) and copolymer (K value 53) composed of vinyl chloride (92 weight percent) and cetyl vinyl ether (8 weight percent), are compared with those of the plasticized PVC composition usually known at the present. Line A in FIG. 1 shows the variation of impact strength in the case where the aforesaid copolymer has been added to PVC. Line B shows the variation of impact strength in the case where plasticizer, dioctylphthalate (DOP) has been added to PVC. Dotted lines in FIG. 1 show respectively the relationship of equal processing characteristics between the lines A and B, and these dotted lines are obtained by correspondingly connecting the points $a_1$, $a_2$ and $a_3$ on the line A with points $b_1$, $b_2$ and $b_3$ on the line B. The point $a_1$ on the line A and the point $b_1$ on the line B have the equal processing characteristics, and also the points $a_2$ and $b_2$ and $a_3$ and $b_3$ have likewise equal processing characteristics with each other.

Lines C and D in FIG. 2 show also respectively the variation of flex temperature in the case where a copolymer and plasticizer have respectively been added to PVC. Dotted lines in FIG. 2 show also the relationship of equal processing characteristics, and these dotted lines are obtained in the same manner as in FIG. 1. The points $c_1$, $c_2$ and $c_3$ on the line C have correspondingly equal processing characteristics to the points $d_1$, $d_2$ and $d_3$ like the case with FIG. 1.

As shown in FIGS. 1 and 2, the new composition of this invention has the superior workability without impairing the impact strength and the flex temperature.

The impact strength was measured with a specimen of 35 x 35 x 1.5 mm. press sheet obtained after kneading 100 parts of the composition and 2 parts of an organo-tin sulfur stabilizer in accordance with the British standard 2782 (1957) at 0° C.

The flex temperature was measured by the method of ASTM D–746–57T. In the evaluation of workability, the flow rate was tested by means of the extrusion plastometer with a nozzle of 1.0 x 10 mm., under the load of 150 kg./cm.$^2$ and at a temperature of 170 and 180° C. When the flow rate of the two different compositions was measured to be equal, these compositions were regarded as having equal workability.

As can be seen from the above descriptions, the PVC composition of the present invention brings about the following characteristics in its processing:

(1) According to the present invention, the same workability can be obtained without necessitating to add a large quantity of plasticizer as in the case of the processing of the usual commercial PVC.

(2) As the processing temperature can be lowered, there is no fear that the thermal decomposition takes place.

(3) The final product can be improved in its impact resistance, resistance to brittleness and resistance to heat deformation.

(4) As the final product does not contain a large quantity of plasticizer, there is no defect that the plasticizer may exude at a later time.

(5) A weather-proof property and the fastness of the final product can be increased.

Further, the effects obtained by the present invention are, by way of example, exemplified by the following table:

| | Copolymer and plasticizer (DOP) in PVC composition having the same workability (percent) | | | | | |
|---|---|---|---|---|---|---|
| (a) Copolymer content by weight percent in composition of this invention | 4 | 8 | 10 | 6 | 10 | 14 |
| (b) Plasticizer (DOP) content by weight percent in commercial PVC composition | 2 | 4 | 5 | 3 | 5 | 7 |
| | Impact strength (kg. m.) | | | Flex temperature (° C.) | | |
| PVC composition of this invention having the composition corresponding to the abovementioned (a) | 3.5 | 3.2 | 3.0 | 68 | 68 | 67 |
| Commercial PVC composition having the composition corresponding to the abovementioned (b) | 2.5 | 1.2 | 1.0 | 62 | 56 | 50 |

Remarks, so far as the above table is concerned:

(1) The PVC composition obtained by blending a copolymer with the general PVC in accordance with the present invention has the same workability as that in which a plasticizer (DOP) has been added to the commercial PVC in about one half amount of the said copolymer used in the present invention.

(2) The impact strength and flex temperature of the product in that case are respectively far better than those of the product added with the plasticizer and are not substantially effected by the addition of the copolymer.

The invention is further described in the following examples, which serve to illustrate the composition of the present invention and the method for the production of the said composition.

Example 1

A copolymer of a vinyl chloride with an alkyl vinyl ether was produced by carrying out the polymerization at 55° C. for 30 hrs. by the following recipes.

|  | Grm. |
|---|---|
| Vinyl chloride | 95 |
| Cetyl vinyl ether | 5 |
| Water | 300 |
| Methyl cellulose | 0.2 |
| Lauroyl peroxide | 0.5 |

The copolymer thus produced had K value of 65. Analysis of chlorine content showed that the copolymer consisted of 96% by weight of vinyl chloride and 4% by weight of cetyl vinyl ether.

Five (5) parts of the copolymer were then blended mechanically with 95 parts of commercial grade of PVC, of which K value is 65. The mechanical and thermal properties of the blended composition were measured in comparison with a plasticized PVC composition having an equal flowability. The equal flowability of this blend was obtained by the composition of the said PVC containing 1% by weight of DOP. The impact strength, brittle temperature and flex temperature were then measured for these two compositions having the equal workability.

The brittle temperature was measured by the method of ASTM D746–55T.

|  | Impact strength (kg. m.) | Brittle temp. (° C.) | Flex temp. (° C.) |
|---|---|---|---|
| The blend in this invention | 4.1 | −12 | 69 |
| PVC containing 1% DOP | 3.0 | −8 | 67 |

These data show that the blended composition of the present invention has higher impact strength, higher flex temperature and lower brittle temperature. The PVC used in this blend had impact strength of 4.3 kg. m., brittle temperature of −15° C., and flex temperature of 70° C.

The copolymer used in this blend had the same heat stability by discoloration as PVC after testing in gear oven at 180° C. According to the weathering test of ASTM D620–49, the said copolymer had also the same weathering permanency as PVC. Thus, this composition of the present invention with improved workability provides the PVC products having better resistances to impact, brittleness and heat deformation without diminishing permanency to heat and light stability.

Example 2

By the following recipes, a copolymer was produced by carrying out the polymerization at 57° C. for 35 hrs.

|  | Grm. |
|---|---|
| Vinyl chloride | 90 |
| Myristyl vinyl ether | 10 |
| Water | 200 |
| Azo-bisisobutyronitrile | 0.3 |
| Polyvinyl alcohol | 0.3 |

Thirty (30) parts of copolymer thus produced, of vinyl chloride (92 weight percent) and myristyl vinyl ether (8 weight percent) having K value 52 were blended mechanically with 70 parts of PVC, of which K value was 60.

The flow rate of blended composition was equivalent to that of the composition of the said PVC containing 7% by weight of DOP.

The following data show properties of these two compositions, one of which is blended and the other is externally plasticized.

|  | Impact strength (kg. m.) | Brittle temp. (° C.) | Flex temp. (° C.) |
|---|---|---|---|
| The blend in this invention | 0.8 | −10 | 63 |
| PVC containing 7% DOP | 0.5 | 8 | 52 |

As can be seen from these data, the blended composition of this invention has higher impact strength and lower brittle point without lowering the flex temperature, as compared with the externally plasticized composition having the same flow rate.

Example 3

By the following recipes, a copolymer was produced by carrying out the polymerization at 55° C. for 40 hrs.

|  | Grm. |
|---|---|
| Vinyl chloride | 85 |
| Lauryl vinyl ether | 15 |
| Water | 250 |
| Polyvinyl alcohol | 0.3 |
| Benzoyl peroxide | 0.5 |

Four (4) parts of the copolymer thus produced, consisting of 87% by weight of vinyl chloride and of 13% by weight of lauryl vinyl ether were then blended mechanically with 96 parts of plasticized PVC composition containing 4% by weight of tricresyl phosphate (TCP). K values of the copolymer and PVC were respectively 52 and 65. The flow rate of the blended composition was equal to that of the plasticized PVC (K value 65) composition containing 7% by weight of TCP.

The following shows properties of these two compositions.

|  | Impact strength (kg. m.) | Brittle point (° C.) | Flex temp. (° C.) |
|---|---|---|---|
| The blend in this invention | 1.5 | 0 | 61 |
| PVC containing 7% TCP | 0.2 | 8 | 56 |

These data show that the blended composition has better resistances to impact, brittleness and heat deformation, as compared with the much plasticized latter composition.

Example 4

By the following recipes, a copolymer was produced in an emulsion state by carrying out polymerization at 60° C. for 30 hrs.

|  | Grm. |
|---|---|
| Vinyl chloride | 76 |
| Lauryl vinyl ether | 24 |
| Water | 200 |
| Ammonium persulfate | 0.5 |
| Dodecyl benzene sulfonate Na | 2 |

Sixty (60) parts of the emulsion of the copolymer consisting of 80% by weight of vinyl chloride and of 20% by weight of lauryl vinyl ether, of which K value was 50, were blended with 40 parts of commercial PVC emulsion which contained 50% by weight of PVC, of which K value was 62.

The flow rate of the resin obtained from this blended emulsion was equal to that of the composition of the said PVC containing 20% by weight of DOP.

The properties of these two compositions were shown in the following.

|  | Impact strength (kg. m.) | Brittle point (° C.) | Flex temp. (° C.) |
|---|---|---|---|
| The blend in this invention | 0.4 | −5 | 51 |
| PVC containing 20% DOP | 0.1 | 12 | 28 |

As these data show, this blended composition having equal workability to that of the PVC composition which contains 20% by weight of DOP, has a lower brittle point and a higher flex temperature. These two compositions, to which 2% by weight of stabilizer T-17M was added, were then formed into sheets of 2 mm. thickness by calendering. Ten (10) x 10 mm. of these sheets were interposed between filter papers and further covered on their both sides with thin aluminum sheets. Thus, two specimens, respectively prepared from the aforementioned two compositions, were placed in the gear oven at 70° C. After 12 hrs. the reduced weight by percent was measured.

Reduced weight (percent)
The blend in this invention _____ 0.01
PVC containing 20% DOP _____ 0.07

From this result, it will be seen that the blended composition not only has several merits of the present invention but has only a slight exudation of plasticizer, as compared with the plasticized PVC composition usually known at the present.

*Example 5*

A copolymer of a vinyl chloride with an alkyl vinyl ether was produced by the following recipes at 58° C. for 35 hrs.

|  | Grm. |
|---|---|
| Vinyl chloride | 86 |
| Cetyl vinyl ether | 14 |
| Water | 300 |
| Methyl cellulose | 0.3 |
| Azo-bisisobutyronitrile | 0.3 |

Ten (10) parts of the copolymer (K value 51) thus produced, consisting of 88% by weight of vinyl chloride and 12% by weight of cetyl vinyl ether were blended with 90 parts of the copolymer consisting of 97% by weight of vinyl chloride and 3% by weight of vinyl acetate.

The blending of these polymers was carried out in a state of polymerized suspension. The same flow rate as this blend composition was obtained from the said copolymer of vinyl chloride and vinyl acetate containing 3% by weight of DOP.

The properties of these two copolymers were compared as follows:

|  | Impact strength (kg. m.) | Brittle point (° C.) | Flex temp. (° C.) |
|---|---|---|---|
| The blend in this invention | 1.4 | 0 | 64 |
| Vinyl chloride-vinyl acetate copolymer containing 3% DOP | 0.7 | 20 | 58 |

As the data show, the blended composition having improved workability has higher flex temperature and higher resistances to impact and low temperature brittleness.

What we claim is:
1. A polyvinyl chloride composition having improved processing characteristics without impairing the impact resistance, resistance to low temperature brittleness and resistance to heat deformation, which consists essentially of from 5 to 99.5% by weight of polyvinyl chloride and from 95 to 0.5% by weight of a copolymer of vinyl chloride with an alkyl vinyl ether and in which the said copolymer consists essentially of from 60 to 99.5% by weight of vinyl chloride and from 40 to 0.5% by weight of alkyl vinyl ether, an alkyl group in the alkyl vinyl ether containing not less than 8 and not more than 18 carbon atoms.

2. The composition of claim 1, wherein the quantity of polyvinyl chloride is from 50 to 98% by weight and the quantity of the said copolymer is from 50 to 2% by weight.

3. The composition of claim 1, in which the said copolymer consists essentially of from 70 to 98% by weight of vinyl chloride and from 30 to 2% by weight of alkyl vinyl ether.

4. The composition of claim 3, in which the alkyl group of the alkyl vinyl ether contains not less than 12 and not more than 16 carbons atoms.

5. A polyvinyl chloride composition having improved processing characteristics without impairing the impact resistance, resistance to low temperature brittleness and resistance to heat deformation, which consists essentially of from 5 to 99.5% by weight of polyvinyl chloride and of from 95 to 0.5% by weight of a copolymer of vinyl chloride with an alkyl vinyl ether and in which the said copolymer consists essentially of from 60 to 99.5% by weight of vinyl chloride and from 40 to 0.5% by weight of alkyl vinyl ether containing not less than 8 and not more than 18 carbon atoms in its alkyl group, the said polyvinyl chloride containing below 10% by weight of a plasticizer.

References Cited by the Examiner
UNITED STATES PATENTS

| 2,016,490 | 10/35 | Fikentscher | 260—91.1 |
| 2,520,959 | 9/50 | Powers | 260—884 |
| 2,734,890 | 2/56 | Bortnick et al. | 260—873 |
| 2,871,203 | 1/59 | Melamed | 260—899 |
| 3,023,198 | 2/62 | Nowlin | 260—887 |

MURRAY TILLMAN, *Primary Examiner.*

L. J. BERCOVITZ, D. ARNOLD, *Examiners.*